Sept. 20, 1966  P. W. BROWN  3,273,675
DISC BRAKES FOR VEHICLES
Filed April 29, 1964  3 Sheets-Sheet 2
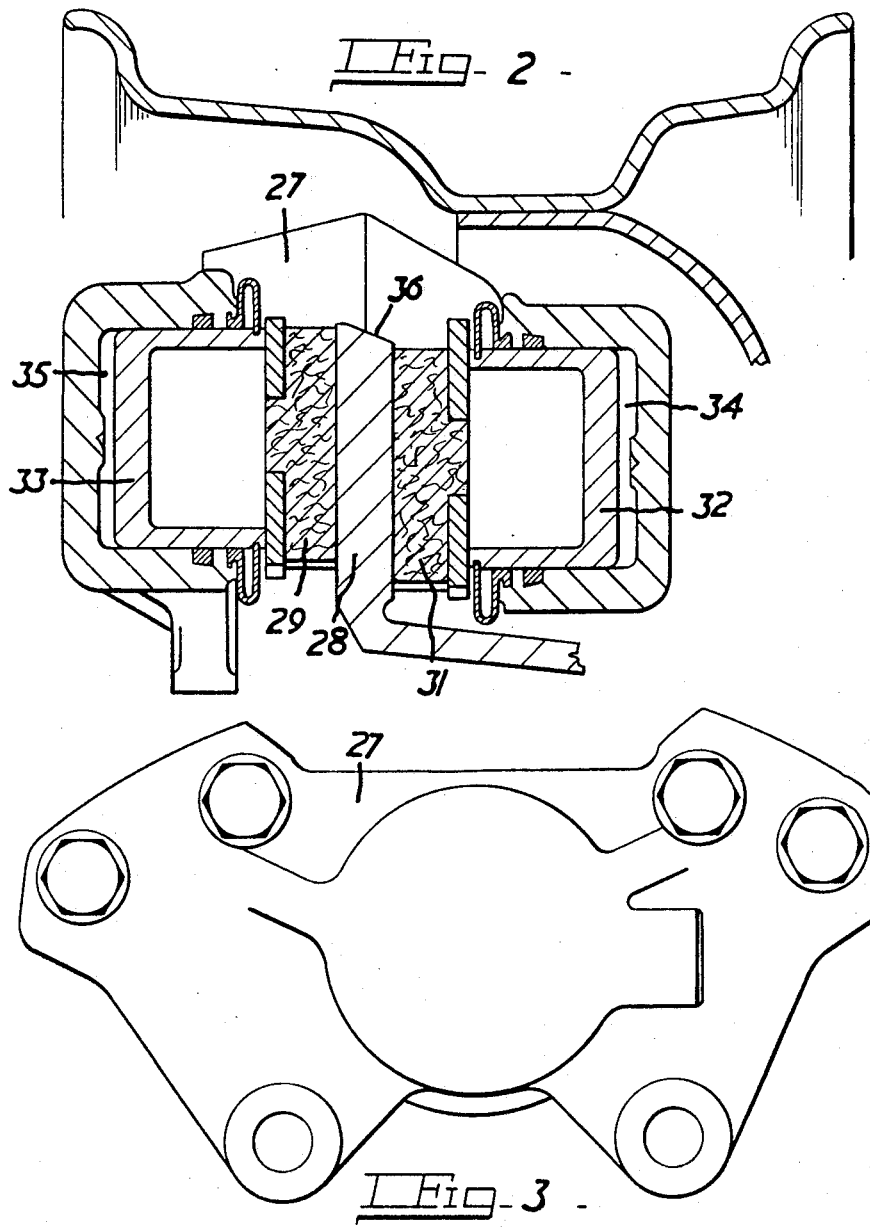
Peter William Brown
BY Scrivener Parker Scrivener + Clarke

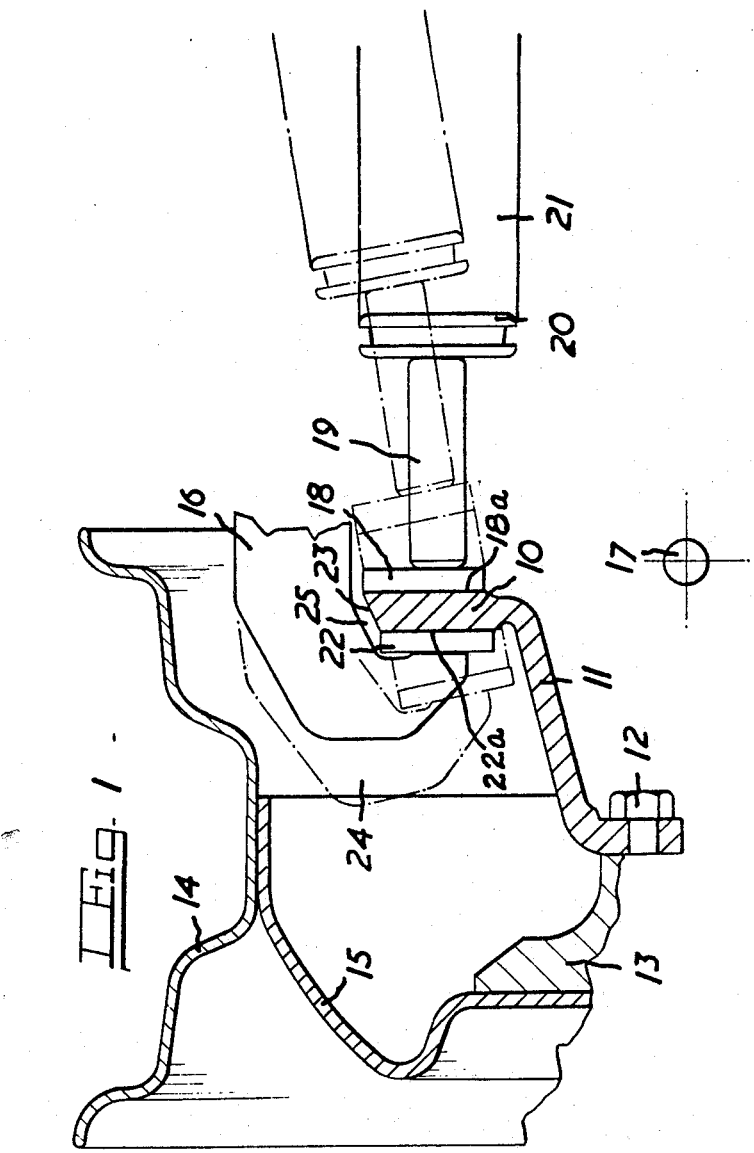

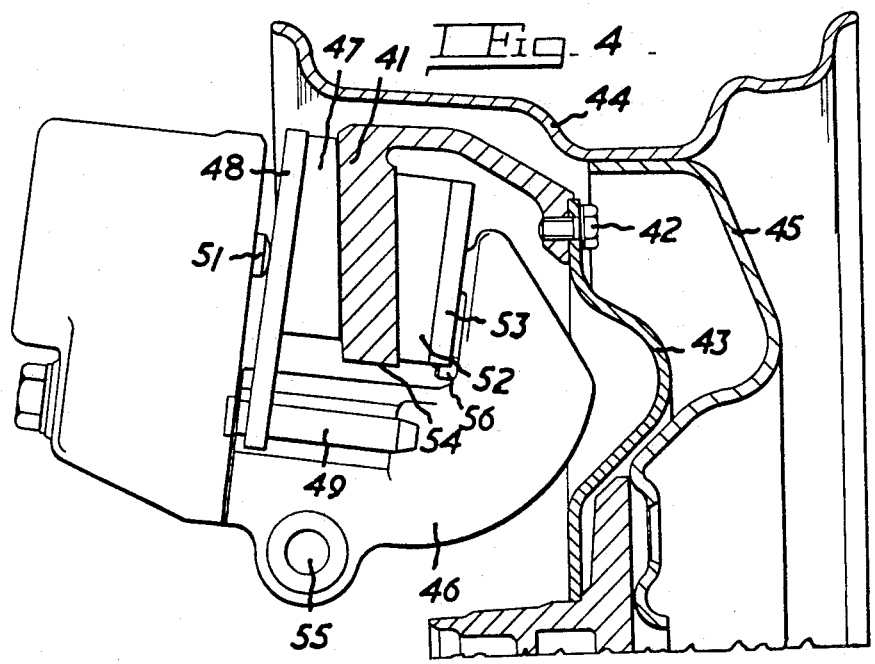

United States Patent Office 3,273,675
Patented Sept. 20, 1966

3,273,675
DISC BRAKES FOR VEHICLES
Peter William Brown, Birmingham, England, assignor to Girling Limited, Birmingham, England, a British company
Filed Apr. 29, 1964, Ser. No. 363,373
3 Claims. (Cl. 188—73)

This invention relates to improvements in disc brakes of vehicles of the kind in which friction pads for engagement with opposite faces of a brake disc rotatable with a wheel are mounted in a non-rotatable caliper which straddles a portion of a periphery of the disc.

The disc is usually mounted on the inboard side of a dished wheel carrying a well-base rim for a tire and there is only a limited space available for the caliper on the outboard side of the disc between the hub and the wheel rim.

With most installations this restriction determines the maximum diameter of disc which can be used, and with wheels of small diameter it becomes a series problem to install a disc of sufficient diameter to provide an adequate standard of braking.

According to our invention, in a disc brake of the kind set forth the friction pad on one side of the disc is located radially inwards from the pad on the other side. In one arrangement the outboard pad is displaced radially inwards and its displacement need only be relatively small, and preferably the peripheral edge of the disc is chamfered so that the outer edge of each pad is substantially aligned with the peripheral edge of the face of the disc with which it engages.

A maximum radial clearance is thus provided between the wheel rim and the periphery of the disc and pad assembly for the accommodation of the caliper.

Our invention is applicable to various forms of disc brake.

Three forms of disc brake embodying our invention are illustrated by way of example in the accompanying drawings in which:

FIGURE 1 is a diagrammatic side elevation partly in section of one form of disc brake;

FIGURE 2 is a sectional side elevation of another form of brake;

FIGURE 3 is an end view of the caliper of the brake shown in FIGURE 2; and

FIGURE 4 is a side elevation partly in section of a third form of brake.

In the arrangement shown in FIGURE 1 the brake disc 10 is carried by an axially extending coned flange 11 which is secured by bolts 12 to the hub 13 of a rotatable wheel of a vehicle.

The wheel rim 14 is carried from the hub by a dished disc 15. The disc 10 has two opposed flat braking surfaces which lie in parallel planes at right angles to the axis of the disc.

A portion of the periphery of the disc is straddled by a rigid caliper 16 which is mounted to swing about a pivot 17 of which the axis is at right angles to the axis of the disc and which is spaced radially inwards from the disc. A friction pad 18 mounted in the caliper on the inboard side of the disc is adapted to be urged into engagement with adjacent braking surface or path 18a on the disc by a plunger 19 actuated by a piston 20 working in an hydraulic cylinder 21 in the inboard limb of the caliper. A second friction pad 22 located in the caliper on the outboard side of the disc is urged into engagement with the braking surface or path 22a on the outboard side of the caliper by the reaction on the caliper when fluid under pressure is supplied to the cylinder 21.

As is readily apparent from the drawings and in accordance with the invention, the braking paths 18a, 22a are arranged so that the annular center line of path 22a is spaced radially inwardly from the inboard path 18a whereby one braking path is radially staggered with respect to the other.

The friction pad 22 is displaced radially inwards with respect to the pad 18, and the peripheral edge of the brake disc is chamfered as shown at 23, the face of greater diameter being on the inboard side and the outer edge of each pad being substantially aligned with the peripheral edge of the face of the disc with which it engages.

The pads 18 at 22 are located and guided for movement towards and away from the disc by means located in the caliper of which the means for guiding and locating the friction pad 22 are displaced radially inwards from the guiding and locating means for the pad 18.

It will be appreciated from the drawing that this arrangement of the friction pads and disc allows the limb of the caliper on the outboard side of the disc to be of a minimum radial dimension in relation to the diameter of the disc so that a disc of maximum diameter can be used with a wheel rim of given radius.

The dotted line 24 in FIGURE 1 shows the outline of the outboard limb of the caliper when the friction pads are new and the full lines show it when the friction pads are partly worn.

In the usual disc brake in which axially aligned friction pads are located in a caliper mounted to swing about an axis at right angles to the disc and one friction pad is directly actuated while the other is indirectly actuated by the reaction on the caliper the clamping forces on the opposed pads are not located at the same radius from the axis of the disc owing to taper wear of the friction pads.

The indirectly actuated pad wears most at its largest radius and its clamping load is displaced radially outwards, while the directly actuated pad wears most at smallest radius so that its clamping load is displaced inwardly from its mean radius.

This offsetting of the clamping loads causes a couple to be applied to the brake disc in a plane perpendicular to the plane of the disc.

By locating the indirectly actuated friction pad on the outboard side of the disc and displacing it radially inwards with respect to the directly actuated pad as shown in FIGURE 1 the couple normally applied to the disc in a swinging caliper brake is reduced or eliminated.

The optimum contour for the peripheral edge of the disc is the solid of revolution about the axis of the disc of an arc struck about the centre line of the caliper pivot 17 in a plane perpendicular to that line and containing the axis of the disc.

That shape maintains the disc to caliper clearance 25 constant throughout the swing of the caliper as the friction pads wear and therefore gives the maximum possible size of disc in a given situation.

In the brake shown in FIGURES 2 and 3 the caliper 27 is axially fixed relative to the disc 28. Friction pads 29 and 31 in the caliper on opposite sides of the disc and guided and located by means in the caliper are adapted to be urged into engagement with braking surfaces on opposite sides of the disc by pistons 32 and 33 working in opposed hydraulic cylinders 34 and 35. The friction pad 31 on the outboard side of the disc is displaced radially inwards with respect to the pad 29 on the inboard side and the axes of the respective cylinders are similarly displaced.

The guiding and locating means for the friction pad 31 are displaced radially inwards from the guiding and locating means for the pad 29.

The peripheral edge of the disc is chamfered as shown at 36 in such a direction that the outer edge of each pad is substantially aligned with the peripheral edge of the face of the disc with which it engages.

In the brake shown in FIGURE 4 the brake disc is a ring 41 extending radially inwards from an axially extending flange which is secured by bolts 42 to a pressing 43 mounted on the hub of a wheel. This assembly is housed within the rim 44 of the wheel which is carried by a dished disc 45.

The inner periphery of the ring 41 is straddled by a caliper 46 mounted to swing about a stationary pivot 55 which is located radially inwards from the ring and of which the axis is at right angles to the axis of the hub.

A friction pad 47 adapted to engage the inboard face of the ring is carried by a rigid backing plate 48 guided on pins 49 for movement towards and away from the disc and is urged into engagement with the disc by the piston rod 51 of a piston working in an hydraulic cylinder in the inboard limb of the caliper. A second friction pad 52 mounted on a backing plate 53 and guided on members 56 is located in the caliper on the outboard side of the ring and is urged into engagement with the outboard face of the ring by the reaction on the caliper when the hydraulic cylinder is pressurized.

The pins 49 on which the backing plate 48 is guided are offset radially inwards from the members 56 on which the friction pad 52 is guided.

The inner edge of the ring 41 is chamfered as shown at 54 at such an angle that the clearance between this edge and the caliper does not vary appreciably as the friction pads wear and the angular position of the caliper changes.

Although in the foregoing we have described disc brakes in which the friction pad on the outboard side of the brake disc is located radially inwards from the pad on the inboard side, it will be appreciated that the present invention includes arrangements in which the friction pad on the inboard side is located radially inwards from the pads on the outboard side.

The invention is particularly applicable to brakes in which the disc 10, 36 or 41 is of substantial axial thickness and it will be appreciated that by chamfering its peripheral edge as described above with relative radial displacement of the friction pads, maximum use is made of the space within the wheel rim.

I claim:

1. A disc brake comprising a rotatable disc, a caliper straddling a portion of the peripheral edge of the disc, a hinge adapted to mount said caliper to a rigid relatively stationary part for angular movement about an axis substantially at right angles to that of the disc, friction members located in the caliper for engagement with opposite sides of the disc, means located in the caliper for applying at least one friction member to the disc, and annular parallel braking paths on opposite sides of the disc for engagement by said friction members, the annular centerline of one of said paths being spaced radially inwardly with respect to the other whereby one braking path is staggered radially inwardly with respect to the other, the outer edges of the respective braking paths being located substantially on the peripheral edges of the disc and lying substantially on an arc struck about the axis of said hinge whereby the relatively radial staggered position of said braking paths is constant with respect to the axis of said disc throughout the wear life of the pads.

2. The disc brake of claim 1 wherein the peripheral edge of the disc is chamfered along a substantially straight line.

3. The disc brake of claim 1 wherein the outboard braking path on said disc is staggered radially inwardly with respect to the inboard side of said disc.

References Cited by the Examiner
UNITED STATES PATENTS

| | | | |
|---|---|---|---|
| 3,044,580 | 7/1962 | Butler | 188—73 X |
| 3,162,272 | 12/1964 | Gancel | 188—73 |
| 3,182,753 | 5/1965 | Gancel | 188—73 |
| 3,186,517 | 6/1965 | Harrison | 188—23 |

MILTON BUCHLER, *Primary Examiner.*

ARTHUR L. LA POINT, *Examiner.*

G. E. A. HALVOSA, *Assistant Examiner.*